No. 716,155. Patented Dec. 16, 1902.
J. H. WEST.
ELECTRIC CABLE.
(Application filed Sept. 21, 1901.)
(No Model.) 2 Sheets—Sheet 1.

Witnesses: Inventor
Julius Henrik West
by
Attys.

No. 716,155. Patented Dec. 16, 1902.
J. H. WEST.
ELECTRIC CABLE.
(Application filed Sept. 21, 1901.)

(No Model.) 2 Sheets—Sheet 2.

Witnesses. Inventor.
Julius Henrik West.
by Henry Orth &Son
Attys.

UNITED STATES PATENT OFFICE.

JULIUS HENRIK WEST, OF BERLIN, GERMANY.

ELECTRIC CABLE.

SPECIFICATION forming part of Letters Patent No. 716,155, dated December 16, 1902.

Application filed September 21, 1901. Serial No. 76,127. (No model.)

*To all whom it may concern:*

Be it known that I, JULIUS HENRIK WEST, engineer, a subject of the King of Denmark, and a resident of Berlin, Germany, have invented a certain new and useful Improvement in Electric Cables; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 2:
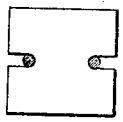
Figure 1:
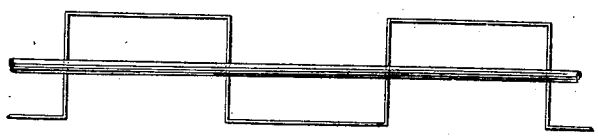
Figure 4:
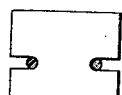
Figure 3:
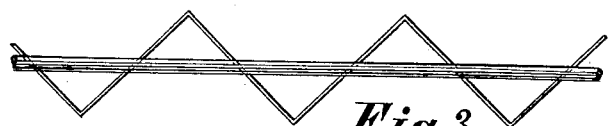
Figure 6:
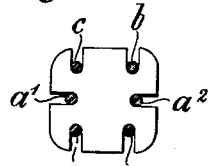
Figure 5:
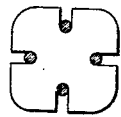
Figure 7:
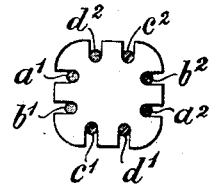
Figure 8:
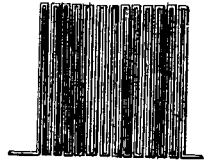
Figure 9:
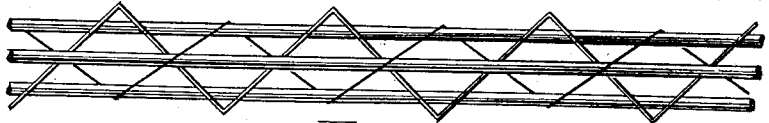
Figure 10:
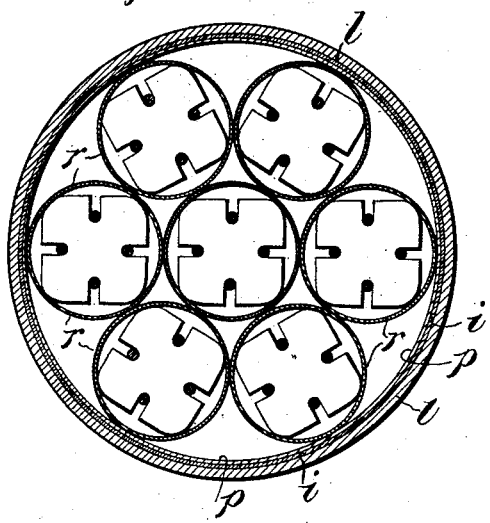
Figure 11:
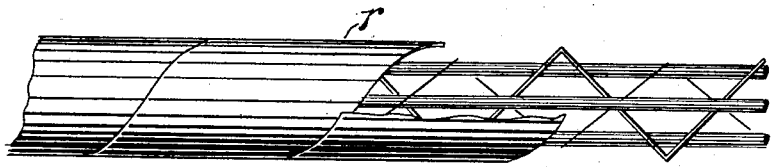

Figure 1 is a side elevation, and Fig. 2 a section, of a known form of cable. Fig. 3 is an elevation, and Fig. 4 a section, of a cable made in accordance with this invention, showing two insulated wires. Figs. 5, 6, and 7 show sections carrying four, six, and eight wires, respectively. Fig. 8 shows the machine-made strip to form the cable, and Fig. 9 a cable of four wires assembled. Fig. 10 is a section showing seven zigzag strips having insulation around each strip and an outer covering for the entire cable, and Fig. 11 is a side elevation showing a covered zigzag strip.

For the purpose of reducing the constants of the dielectrics used in electric cables as much as possible instead of using a paper strip wound around the wires it has been proposed by Breisig (*Elektrotechnische Zeitschrift*, 1899, pages 129 and 130) to use a paper strip, arranged as shown in Fig. 1, folded in the shape of a meander and provided at each side with notches, Fig. 2, in which two wires are laid and are secured by means of an external covering. When such a strip is used, the construction of the cables is rendered very difficult and cannot easily be effected in a machine. These difficulties can, however, be obviated by using a strip folded in a zigzag manner, as shown in Fig. 3, instead of a strip as shown in Fig. 1. Fig. 4 is a cross-section corresponding to Fig. 3. Such a zigzag strip can also be used for insulating four, six, or eight wires from one another, as shown in Figs. 5, 6, and 7, and if the corners be rounded so that an approximately circular cross-section is obtained, several such bundles of wires can be twisted together and yet have no inductive action on one another and waste no space.

In a cable according to Fig. 6 the wires $a'$ and $a^2$ form one circuit, the wires $b\ b$ a second, and $c\ c$ a third. The two circuits $b\ b$ and $c\ c$ are arranged in such a way that they have no inductive action on each other; but the circuits $a'$ and $a^2$ are influenced by the two other circuits. In order to prevent this disturbing action, all that is necessary is to change the relative positions of the wires $a'$ and $a^2$—i. e., to connect $a'$ of the one section of the cable with $a^2$ of the adjoining section, and vice versa, and $a^2$ of the first section with $a'$ of the adjoining section at regular intervals when the several lengths of the cable are connected together in laying it. In a similar manner in a cable according to Fig. 7, in which one strip of paper serves for separating eight wires, induction disturbances can be obviated by retaining the circuits $a'$ and $a^2$ and $c'$ and $c^2$ in their relative positions and changing the relative positions of the wires of the two other circuits $b'\ b^2$ and $d'$ and $d^2$ at regular intervals. Cables constructed in this manner have a very low electrostatic charge. The average constant of the dielectric is reduced almost to 1, since mainly air is used as an insulator and the quantities of paper between the wires are extremely small. The construction described has the additional advantage that without increasing the cost of insulation in an appreciable degree the wires can be placed as far apart as desired, so that it is possible to produce cables which are suitable for interurban and submarine telephone-wires. For this purpose a narrow strip of paper of suitable length is folded by mechanical means in the manner shown in Fig. 8, the pressed and folded strip is provided, by means of circular saws or cutters, with four, six, or eight notches, as shown in Figs. 5, 6, or 7, and the corners are rounded off by means of a plane or a cutter. The insulating-strip thus prepared is placed in a cable-machine and a wire is inserted into each notch, whereupon while the wires are being drawn forward the paper strip is drawn apart by means of simple devices until it assumes the form shown in Fig. 9. Thereupon a strong cotton or silk thread $j$ is wound around the wires and holds them in position. If necessary, such a bundle of wires can be covered with a wide strip of paper $r$, as shown in Fig. 10. The zigzag separating-strip and also the outer covering do not require to be of paper, but may be of any other suitable material. The required number of such bundles is then twisted together and is covered with paper $p$ and then with impregnated fibrous material $i$ and finally with a lead covering $l$. If necessary, a further protecting-armature is placed on the exterior.

Having thus described my invention, what I claim as new therein, and desire to secure by Letters Patent of the United States of America, is—

1. An electric cable comprising a zigzag strip of insulating material provided with notches and wires in said notches, substantially as described.

2. An electric cable comprising a zigzag strip of insulating material having notches at the sides and at the bends of said strip, and wires in said notches, substantially as described.

3. An electric cable comprising a notched zigzag strip of paper and wires in said notches, substantially as described.

4. An electric cable comprising a notched zigzag strip of paper, wires in said notches and an insulating-covering, substantially as described.

5. An electric cable, composed of elements twisted together, each element comprising a zigzag strip of paper having notches in its sides and in its bends, wires in said notches and an insulating-covering, substantially as described.

6. An electric cable comprising a continuous zigzag strip of insulating material having rounded corners and a plurality of notches in its sides and in its bends, and wires held in said notches by a cord of insulating fibrous material, substantially as described.

7. An electric cable, composed of a plurality of elements twisted together, each element comprising a zigzag strip of insulating material having rounded corners and notches in its sides and bends, wires held in said notches by a cord of insulating material wound around the whole, and a covering of insulating material, a covering of paper for the elements twisted together and one of impregnated fiber, substantially as described.

In testimony that I claim the foregoing as my invention I have signed my name in presence of two subscribing witnesses.

JULIUS HENRIK WEST.

Witnesses:
HENRY HASPER,
WOLDEMAR HAUPT.